UNITED STATES PATENT OFFICE 2,344,289

COMPOSITION CONTAINING A DIAMINO DIAZINYL SUBSTITUTED - ALKYL SULPHIDE

Gaetano F. D'Alelio and James W. Underwood, Pittsfield, Mass., assignors to General Electric Company, a corporation of New York No Drawing. Application May 21, 1942,
Serial No. 443,978

20 Claims. (Cl. 260—42)

This invention relates to the production of new materials and more particularly is concerned with synthetic compositions of particular utility in the plastics and coating arts and which contain, or are produced from, diamino diazinyl halogeno carboxy-, carboaliphaticoxy- or carboaromaticoxy-alkyl sulphides.

The diazine derivatives used in carrying the present invention into effect may be represented by the following general formula:

I
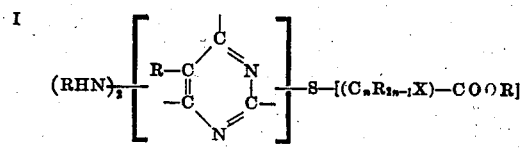

In the above formula $n$ represents an integer and is at least 1 and not more than 2, X represents a halogen atom, more particularly a chlorine, bromine, fluorine or iodine atom, and R represents a member of the class consisting of hydrogen and monovalent hydrocarbon and substituted hydrocarbon radicals, more particularly halo-hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiarybutylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in the —NHR groupings of Formula I is hydrogen and R in the —COOR grouping is either hydrogen or an unsubstituted monovalent hydrocarbon radical, e. g., an aliphatic radical such as methyl, ethyl, propyl, butyl, pentyl, hexyl, allyl, methallyl, crotyl, etc. However, there also may be used in carrying the present invention into effect chemical compounds such, for instance, as those represented by the general formulas:

II
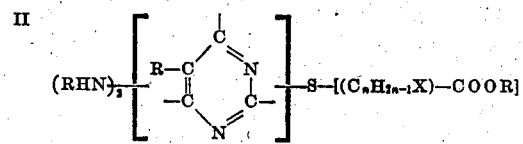

and, more particularly,

III
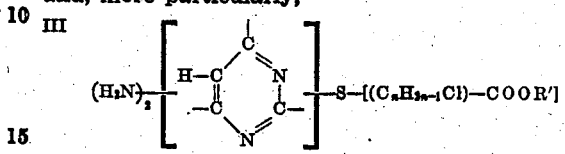

and

IV
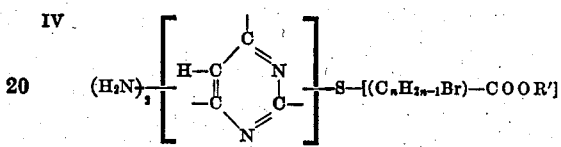

where $n$, X and R have the same meanings as given above with respect to Formula I and R' (Formulas III and IV) represents hydrogen or an unsubstituted monovalent hydrocarbon radical, numerous examples of which have been given above.

Instead of the 1,3- or meta-diazines (pyrimidines) represented by the above formulas, corresponding derivatives of the 1,2- or ortho-diazines (pyridazines) or of the 1,4- or para-diazines (pyrazines) may be used.

The diazine derivatives used in carrying the present invention into effect are more fully described and are specifically claimed in our copending application Serial No. 443,979, filed concurrently herewith and assigned to the same assignee as the present invention. As pointed out in this copending application, a suitable method of preparing such diazine derivatives comprises effecting reaction in the presence of a hydrohalide acceptor, e. g., an alkali-metal hydroxide, between equimolecular proportions of a mercapto diamino [(—NHR)₂] pyrimidine and a carboxy-, carboaliphaticoxy- or carboaromaticoxy-alkyl dihalide. When a carboxy (—COOH) alkyl dihalide is used as a starting reactant and the proportions of reactants and reaction conditions are such that the hydrogen atom of the —COOH grouping is replaced by the residue of the hydrohalide acceptor, e. g., by an alkali metal, the carboxy compound desired as a final product is obtained by treating this intermediate product with hydrochloric, hydrobromic, sulphuric or other suitable organic or inorganic acid in an amount just sufficient to form the desired carboxy derivative.

Examples of diazine derivatives embraced by Formula I and which may be employed in producing the compositions of this invention are listed below:

The diamino pyrimidyl halogeno carboaliphaticoxy-methyl sulphides, including the diamino pyrimidyl chloro carboaliphaticoxy-methyl sulphides, the diamino pyrimidyl bromo carboaliphaticoxy-methyl sulphides, the diamino pyrimidyl iodo carboaliphaticoxy-methyl sulphides and the diamino pyrimidyl fluoro carboaliphaticoxy-methyl sulphides, more particularly the diamino pyrimidyl halogeno (e. g., chloro, bromo, etc.) alkoxy (e. g., methoxy-, ethoxy-, propoxy-, butoxy, etc.)-methyl sulphides The diamino pyyrimidyl halogeno carboaroxy-methyl sulphides, more particularly the diamino pyrimidyl chloro carboaroxy-methyl sulphides, the diamino pyrimidyl bromo carboaroxy-methyl sulphides, the diamino pyrimidyl iodo carboaroxy-methyl sulphides and the diamino pyrimidyl fluoro carboaroxy-methyl sulphides The diamino pyrimidyl halogeno (chloro, bromo, iodo, fluoro) carboxy-methyl sulphides The diamino pyrimidyl halogeno (chloro, bromo, iodo, fluoro) carboaliphaticoxy (e. g., carboalkoxy)-ethyl sulphides The diamino pyrimidyl halogeno (chloro, bromo, iodo, fluoro) carboaroxy (e. g., carbophenoxy, carbotoloxy, etc.)-ethyl sulphides 2,6-diaminopyrimidyl-4 chloro carbomethoxy-ethyl sulphides 2,6-di-(methylamino) pyrimidyl-4 bromo carbomethoxy-ethyl sulphides 2,6-diamino pyrimidyl-4 bromo carbophenoxy-ethyl sulphides 4,6-diamino pyrimidyl-2 chloro carbophenoxy-ethyl sulphides 2,6-diamino pyrimidyl-4 chloro carbophenoxy-ethyl sulphides 4-amino 6-methylamino pyrimidyl-2 bromo carboxy-methyl sulphide 4,6-diamino 5-methyl pyrimidyl-2 chloro carbomethoxy-methyl sulphide 4-pentylamino 6-benzylamino 5-naphthyl pyrimidyl-2 alpha-(beta-iodo carbomethoxy-ethyl) sulphide 2,6 - di - (anilino) 5-benzyl pyrimidyl-4 beta-(alpha-bromo carbophenoxy-propyl) sulphide 2,6-di-(benzylamino) 5-cyclopentyl pyrimidyl-4 alpha-(alpha-chloro carbotoloxy-ethyl) sulphide 2-toluido 6-xylidino 5-tolyl pyrimidyl-4 beta-(beta-iodo carbobenzoxy-pentyl) sulphide 4,6-di-(ethylamino) pyrimidyl-2 chloro carboxy-methyl sulphide 4,6-di-(anilino) pyrimidyl-2 chloro carboxy-methyl sulphide 4,6-di-(bromoanilino) pyrimidyl-2 bromo carboxy-methyl sulphide 4,6 - di-(cyclohexylamino) pyrimidyl-2 chloro carboxy-methyl sulphide 4,6-diamino pyrimidyl-2 alpha-(alpha-chloro carbomethoxy-methyl) sulphide 2,6-diamino 5-methyl pyrimidyl-4 beta-(beta-bromo carboethoxy-ethyl) sulphide 4,6-diamino 5-phenyl pyrimidyl-2 alpha-(beta-chloro carbopropoxy-ethyl) sulphide 2,6-diamino pyrimidyl-4 beta-(alpha-chloro carboethoxy-ethyl) sulphide 4,6-di-(methylamino) pyrimidyl-2 bromo carbobutoxy-methyl sulphide 4,6 - diamino pyrimidyl-2 alpha-(alpha-chloro carbophenoxy-ethyl) sulphide 4,6-diamino pyrimidyl-2 beta-(beta-bromo carbophenoxy-ethyl) sulphide 2,6-diamino 5-propyl pyrimidyl-4 alpha-(beta-chloro carbophenoxy-ethyl) sulphide 2,6-diamino 5-chlorophenyl pyrimidyl-4 beta-(alpha-bromo carbophenoxy-ethyl) sulphide 4,6 - diamino pyrimidyl-2 alpha-(alpha-chloro carbophenoxy-propyl) sulphide 4,6-di-(anilino) pyrimidyl-2 alpha-(alpha-iodo carbophenoxy-propyl) sulphide 4,6 - di-(cyclopentylamino) 5-chloroethyl pyrimidyl - 2 alpha - (gamma-phenyl alpha-chloro carbonaphthoxy-propyl) sulphide 4-ethylamino 5-methyl 6-amino pyrimidyl-2 beta-(beta-chloro carbotoloxy-ethyl) sulphide 2-naphthylamino 5-fluorophenyl 6-amino pyrimidyl-4 beta-(beta-isobutyl beta-bromo carbophenoxy-ethyl) sulphide 4-cyclopentenylamino 6-chloroxylidino pyrimidyl-2 beta-(alpha-chloro beta-benzyl carboethoxy-propyl) sulphide 4,6-diamino 5-iodophenyl pyrimidyl-2 alpha-(beta-iodo carbopentoxy-ethyl) sulphide 4,6-diamino pyrimidyl-2 beta-(alpha-bromo carboxy-ethyl) sulphide It will be understood, of course, by those skilled in the art that, in those compounds listed above that are generically named, the —NHR groups and the thio group may be attached in any arrangement to the symmetrical carbon atoms of the pyrimidine nucleus. In other words, the term "diamino pyrimidyl" includes within its meaning both the 4,6-diamino pyrimidyl-2 and the 2,6-diamino pyrimidyl-4 (2,4-diamino pyrimidyl-6) compounds.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and a halogenated compound of the kind embraced by Formula I, numerous examples of which have been given above. These new reaction products are not only valuable in themselves, but find particular utility when incorporated into an acid-curing thermosetting resin, for example, acid-curing thermosetting phenoplasts and aminoplasts. For instance, we may add a soluble, fusible aldehyde-reaction product of the halogen compound to an acid-curing thermosetting resin and heat the resulting mixture. The aldehydic reaction product accelerates the conversion of the acid-curing thermosetting resin to an insoluble, infusible state. Or, we may cause the halogen compound itself to react with the acid-curing thermosetting resin and thus accelerate the curing of the resin. Or, we may form a rapidly curing resin by effecting reaction between ingredients comprising a halogen compound of the kind embraced by Formula I, an aldehyde, including polymeric aldehydes, hydroxyaldehydes and aldehyde-addition products, and a phenol (including phenol itself, cresols, xylenols, etc.) or an amino or amido compound (including imino and imido compounds), for instance 2,4,6-triamino pyrimidine, 2,4,6-triureido pyrimidine, also aminotriazines, e. g., melamine, ammeline, ammelide, melem, melam, melon, triureido melamine, etc., aminotriazoles, e. g., guanazole, a urea, e. g., urea itself, thiourea, dicyandiamide, etc.

The resin syrups and molding compositions of this invention may be stored for long periods of time without material alteration. In marked contrast the prior acid-curing thermosetting resins, more particularly those containing direct or active curing catalysts such as inorganic acids, e. g., hydrochloric, sulphuric, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In practicing the present invention the condensation between the reactants may be carried out under acid, alkaline or neutral conditions and at normal or at elevated temperatures. Any substance or catalyst which has an alkaline or an acid nature may be used to obtain the acid, alkaline or neutral condition, for example ammonia, sodium hydroxide, calcium hydroxide, methyl amine, diethyl amine, tributyl amine, ethanol amines, tri-isopropanol amine, etc.; mixtures of such alkaline substances; inorganic or organic acids such as hydrochloric, sulphuric, phosphoric, arcylic, crotonic, malonic, etc.; mixtures of such acids; acid salts such as sodium acid sulphate, monosodium phosphate, monosodium phthalate, etc.; basic salts such as ammonium carbonate, potassium carbonate, sodium acetate, etc.; or mixtures of such salts.

We may condense the components used in practicing this invention under various conditions. For example, all the components may be mixed together and the reaction caused to proceed under acid, alkaline or neutral conditions. Or, we may form an acid-curing thermosetting resin (e. g., an acid-curing partial condensation product of ingredients comprising a phenol and an aldehyde, an acid-curing partial condensation product of ingredients comprising an amidogen compound, e. g., melamine, malonic diamide, maleic diamide, urea, thiourea, etc., and an aldehyde), add the hereindescribed halogen compound thereto and effect further condensation. Or, we may first partially condense the halogen compound with a molecular excess of an aldehyde under acid, alkaline or neutral conditions, and then add thereto at least one other aldehyde-reactable organic compound, e. g., a phenol, a urea, aniline, etc., and effect further condensation. Also we may separately partially condense a halogen compound of the kind embraced by Formula I and a different aldehyde-reactable organic compound with an aldehyde and then mix the two products of partial condensation and effect further condensation therebetween. The components of each reaction product may be initially condensed under acid, neutral or alkaline conditions at normal or at elevated temperature.

Still other ways may be employed in combining the components and in producing the unmodified and modified condensation products of this invention, as readily will be understood by those skilled in the art as the description of the invention proceeds. The temperature of reaction may vary from room temperature to the reflux temperature of the mixed reactants at reduced, atmospheric or superatmospheric pressures.

In order that those skilled in the art better may understand how the present invention may be carried into effect, the following illustrative examples thereof are given. All parts are by weight.

Example 1

| | Parts |
|---|---|
| Urea | 30.0 |
| Aqueous formaldehyde (approx. 37.1% HCHO) | 64.8 |
| Aqueous ammonia (approx. 28% NH₃) | 3.0 |
| Aqueous solution of sodium hydroxide (0.46 N) | 2.3 |
| 4,6-diamino pyrimidyl-2 bromo carbomethoxy-ethyl sulphide | 1.5 | were heated together under reflux at the boiling temperature of the mass for 20 minutes. A molding (moldable) composition was made from the resulting resinous syrup by mixing therewith 33.5 parts alpha cellulose in flock form and 0.2 part of a mold lubricant, specifically zinc stearate. The wet molding compound was dried at 70° C. until sufficient moisture had been removed to provide a material that could be molded satisfactorily. A well-cured molded piece having good water resistance was obtained by molding a sample of the dried and ground molding compound for 5 minutes at 135° C. under a pressure of 3,500 pounds per square inch.

Example 2

| | Parts |
|---|---|
| Melamine | 31.5 |
| Aqueous formaldehyde (approx. 37.1% HCHO) | 60.0 |
| Aqueous ammonia (approx. 28% NH₃) | 3.2 |
| Aqueous solution of sodium hydroxide (0.46 N) | 2.3 |
| 4,6-diamino pyrimidyl-2 bromo carbomethoxy-ethyl sulphide | 1.5 |

All of the above ingredients with the exception of the pyrimidine derivative were heated together under reflux at the boiling temperature of the mass for 18 minutes. The pyrimidine derivative was now added and refluxing was continued for an additional 7 minutes to cause it to intercondense with the melamine-formaldehyde partial condensation product. The resulting clear syrup was mixed with 32.4 parts alpha cellulose and 0.2 part zinc stearate to form a molding compound. The wet molding composition was dried and molded as described under Example 1 with the exception that a molding time of only 3½ minutes was employed. The molded piece was well-cured and had a well-knit and homogeneous structure. It had excellent resistance to water. The molding compound showed good plastic flow during molding.

Example 3

| | Parts |
|---|---|
| Thiourea | 38.0 |
| Aqueous formaldehyde (approx. 37.1% HCHO) | 90.0 |
| Aqueous ammonia (approx. 28% NH₃) | 3.8 |
| Aqueous solution of sodium hydroxide (0.46 N) | 2.3 |
| 4,6-diamino pyrimidyl-2 bromo carbomethoxy-ethyl sulphide | 2.5 |

All of the above ingredients with the exception of 1.0 part of the pyrimidine derivative were heated together under reflux at the boiling temperature of the mass for 35 minutes. The remaining one part of the pyrimidine derivative was now added and refluxing was continued for an additional 5 minutes. The resulting resinous syrup was mixed with 48.9 parts alpha cellulose and 0.3 part zinc stearate to form a molding compound. The wet molding composition was dried and molded as described under Example 1, yielding a well-cured molded piece.

Example 4

|  | Parts |
|---|---|
| 4,6-diamino pyrimidyl-2 bromo carbomethoxy-ethyl sulphide | 30.8 |
| Aqueous formaldehyde (approx. 37.1% HCHO) | 160.0 | were heated together under reflux at the boiling temperature of the mass for 2 minutes, yielding a resinous syrup (soluble, fusible reaction product) that cured with good flow characteristics to an infusible mass when a sample of it was heated on a 150° C. hot plate. A satisfactory molding compound that showed adequate flow characteristics during molding was produced by mixing a portion of the thermosetting resin with an equal weight of alpha cellulose and molding for 5 minutes at 140° C. under a pressure of 9,000 pounds per square inch.

Instead of heating the reactants under reflux as above described, the mixture may be shaken for a longer period, for example for 24 to 72 hours or longer at room temperature (20°–30° C.) to effect reaction between the components and to obtain a soluble, fusible reaction product.

Example 5

A phenol-formaldehyde partial condensation product was prepared by heating together the following components, with constant agitation, for 2½ hours at approximately 85–90° C.:

|  | Parts |
|---|---|
| Phenol (freshly distilled) | 180.0 |
| Aqueous formaldehyde (approx. 37.1% HCHO) | 390.0 |
| Sodium carbonate (anhydrous) | 4.4 |

Due to a slight exothermic reaction the temperature rose for a brief period to 96° C. The resinous syrup produced in this manner is identified in the following formula as "syrupy phenolic resin":

|  | Parts |
|---|---|
| Syrupy phenolic resin | 30.0 |
| 4,6-diaminopyrimidyl-2 bromo carbomethoxy-ethyl sulphide | 3.09 |
| Glycerine | 2.0 |

The phenolic resin, which initially was dark red in color, became lighter in color as the pyrimidine derivative lowered the pH of the solution. The reaction mixture was heated slowly under reduced pressure (55 mm. mercury) until an internal resin temperature of 60° C. was reached. The resulting molasses-like liquid resin was poured into a container and heated therein for 48 hours at 70° C. The resin cured to an insoluble and infusible state. The solidified resin was hard, smooth, homogeneous, fairly light in color and opaque. This latter characteristic was due mainly to the fact that the liquid casting resin had been insufficiently dehydrated. The solid resin was clear in its upper portion where the water could escape.

Example 6

|  | Parts |
|---|---|
| Urea | 30.0 |
| Aqueous formaldehyde (approx. 37.1% HCHO) | 67.0 |
| Aqueous ammonia (approx. 28% NH₃) | 3.5 |
| Aqueous solution of sodium hydroxide (0.5 N) | 1.6 | were heated together under reflux at the boiling temperature of the mass for 20 minutes, yielding a resinous syrup that is identified in the following formula as "urea-formaldehyde syrup":

|  | Parts |
|---|---|
| Urea-formaldehyde syrup | 102.0 |
| Reaction product of Example 4 | 12.0 |

These components were heated together under reflux at the boiling temperature of the mass for 2 minutes. The resulting resinous syrup was mixed with 34 parts alpha cellulose and 0.2 part zinc stearate to form a molding composition. The wet molding compound was dried at room temperature until sufficient moisture had been removed to provide a material that could be molded satisfactorily. A sample of the dried and ground molding compound was molded for 5 minutes at 140° C. under a pressure of 8,000 pounds per square inch. A well-cured molded piece having a well-knit and homogeneous structure was obtained. It had good resistance to water, as shown by the fact that it absorbed only 3.27% by weight of water when tested for its water-resistance characteristics by immersing in boiling water for 15 minutes followed by immersion in cold water for 5 minutes.

Example 7

|  | Parts |
|---|---|
| Melamine | 32.0 |
| Aqueous formaldehyde (approx. 37.1% HCHO) | 61.0 |
| Aqueous ammonia (approx. 28% NH₃) | 1.5 |
| Aqueous solution of sodium hydroxide (0.5 N) | 1.25 | were heated together under reflux at the boiling temperature of the mass for 15 minutes, yielding a resinous syrup that is identified in the following formula as "melamine-formaldehyde syrup":

|  | Parts |
|---|---|
| Melamine-formaldehyde syrup | 96.0 |
| Reaction product of Example 4 | 6.2 |

These components were heated together under reflux at the boiling temperature of the mass for 3 minutes. A molding compound was prepared by mixing 32 parts alpha cellulose and 0.2 part zinc stearate with the resulting resinous syrup. This compound was dried and molded as described under Example 6 with the exception that a molding temperature of 135° C. and a molding pressure of 6,750 pounds per square inch were employed. A well-cured molded piece having excellent resistance to water was obtained, as evidenced by the fact that it absorbed only 0.57% by weight of water when tested for its water-resistance characteristics as described under Example 6. The molded piece had good cohesive characteristics and evenness of structure, being slightly better in these respects than the molded article of Example 6. The plasticity of the molding compound during molding was very good, being somewhat better in this respect than the molding compound of Example 6.

Example 8

| | Parts |
|---|---|
| Dimethylol urea (commercial grade containing approx. 11% by weight of water | 60.0 |
| Aqueous ammonia (approx. 28% NH₃) | 3.5 |
| Aqueous solution of sodium hydroxide (0.5 N) | 1.6 |
| Water | 42.0 | were heated together under reflux at the boiling temperature of the mass for 20 minutes, yielding a resinous syrup that is identified in the following formula as "dimethylol urea syrup":

| | Parts |
|---|---|
| Dimethylol urea syrup | 107.0 |
| Reaction product of Example 4 | 12.0 |

These components were heated together under reflux at the boiling temperature of the mass for 4 minutes. The resulting resinous syrup was mixed with 36 parts alpha cellulose and 0.2 part zinc stearate to form a molding compound. The wet molding composition was dried and molded as described under Example 6 with the exception that a molding time of 3 minutes and a molding pressure of 13,500 pounds per square inch were employed. A well-molded product was obtained. The molded piece was not quite so uniform in its structure nor did it have quite so good cohesive characteristics as the molded products of Examples 6 and 7. The plasticity of the molding compound during molding was approximately the same as that of the molding compound of Example 6.

Example 9

| | Parts |
|---|---|
| Trimethylol melamine (crystalline) | 43.0 |
| Aqueous ammonia (approx. 28% NH₃) | 1.2 |
| Aqueous solution of sodium hydroxide (0.5 N) | 1.0 |
| Water | 30.4 | were heated together under reflux at the boiling temperature of the mass for 5 minutes, yielding a resinous syrup that is identified in the following formula as "trimethylol melamine syrup":

| | Parts |
|---|---|
| Trimethylol melamine syrup | 76.0 |
| Reaction product of Example 4 | 6.2 |

To the mixture of the above components was added 25 parts alpha cellulose and 0.1 part zinc stearate to form a molding compound. The wet molding composition was dried and molded as described under Example 6 with the exception that a molding time of 3 minutes was employed. The molded article was well cured and had very good resistance to water, as shown by the fact that it absorbed only 0.26% by weight of water when tested for its water-resistance characteristics as described under Example 6. The molded piece had a well-knit and homogeneous structure, being approximately the same in these respects as the molded article of Example 7. The plasticity of the molding compound was very good, being considerably better than that of the molding compounds of Examples 6 and 8 but not quite so good as that of the molding compound of Example 7.

Example 10

| | Parts |
|---|---|
| 1-phenyl guanazole | 35.0 |
| Aqueous formaldehyde (approx. 37.1% HCHO) | 32.4 |
| Aqueous ammonia (approx. 28% NH₃) | 1.2 |
| Aqueous solution of sodium hydroxide (0.5 N) | 0.8 |
| Reaction product of Example 4 | 12.0 | were heated together in an open reaction vessel for 3 minutes, at the end of which period of time separation of a resinous mass took place. The reaction mixture was mixed with 23 parts alpha cellulose and 0.1 part zinc stearate to form a molding compound. The wet molding composition was dried and molded as described under Example 6 with the exception that a molding temperature of 135° C. was employed. The molded article was well cured and absorbed only 1.07% by weight of water when tested for its water-resistance characteristics as described under Example 6. The plasticity of the molding compound during molding was somewhat better than that of any of the preceding examples.

It will be understood, of course, by those skilled in the art that the reaction between the components may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples under reflux at boiling temperature as mentioned in the individual examples, the reaction between the components may be carried out at temperatures ranging, for example, from room temperature up to the boiling temperature of the mass using substantially longer reaction periods.

It will also be understood by those skilled in the art that our invention is not limited to condensation products obtained by reaction of ingredients comprising an aldehyde and the specific halogen compound named in the above illustrative examples. Thus, instead of using 4,6-diamino pyrimidyl-2 bromo carbomethoxy-ethyl sulphide we may use, for example, 2,6-diamino pyrimidyl-4 bromo carbomethoxy-ethyl sulphide, 4,6-diamino pyrimidyl-2 chloro carbomethoxy-ethyl sulphide, 2,6-diamino pyrimidyl-4 chloro carbomethoxy-ethyl sulphide, other diamino pyrimidyl halogeno carboaliphaticoxy-ethyl (or carboxy-ethyl or carboaromaticoxy-ethyl) sulphides (e. g., a diamino pyrimidyl iodo carboalkoxy-ethyl sulphide, a diamino pyrimidyl fluoro carboalkoxy-ethyl sulphide, etc.), a diamino pyrimidyl halogeno carboaromaticoxy-ethyl sulphide (e. g., a diamino pyrimidyl chloro carbophenoxy-ethyl sulphide, a diamino pyrimidyl bromo carbophenoxy-ethyl sulphide, etc.), a diamino pyrimidyl halogeno (chloro, bromo, fluoro, iodo) carboxy-ethyl sulphide, a diamino pyrimidyl halogeno carboxy-, carboaliphaticoxy- or carboaromaticoxy-methyl sulphide, or any other halogen compound (or mixture thereof) embraced by Formula I, numerous specific examples of which have been given hereinbefore.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, heptaldehyde, octaldehyde, benzaldehyde, furfural, hydroxyaldehydes (e. g., glycollic aldehyde, glyceraldehyde, etc.) mixtures thereof, or mixtures of formaldehyde (or compounds engendering formaldehyde) with such aldehydes. Illustrative examples of aldehyde-addition products that may be employed instead of the aldehydes themselves are the mono- and poly-methylol derivatives of urea, thiourea, selenourea and iminourea (numerous specific examples of which are given in D'Alelio copending application Serial No. 377,524, filed February 5, 1941), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminotriazines, etc. Particularly good results are obtained with active methylene-containing bodies such as a methylol urea, more particularly mono- and di-methylol ureas, and a methylol aminotriazine, more particularly a methylol melamine, including monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the halogen compound may be varied over a wide range depending, for example, upon the particular properties desired in the final product and the particular halogen compound used as a starting reactant. Thus, we may use, for example, from 0.5 to 8 or 9 or more mols of an aldehyde for each mol of the halogen compound. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example from 1 to 15 or 20 or more mols of such alkylol derivative for each mol of the halogen compound.

When the halogen compound of the kind embraced by Formula I is used primarily as an intercondensable curing reactant for accelerating the conversion of acid-curing thermosetting resins to an insoluble, infusible state, only a relatively small amount of the halogen compound ordinarily is required, for example an amount corresponding to from 0.2 to 0.3% to 5 or 6% by weight of the resin to be cured, calculated on the basis of the dry resin. In some cases it may be desirable to use higher amounts, for instance up to 8 or 9 or more parts by weight of the halogen compound per 100 parts (net dry) of the acid-curing thermosetting resin. When the halogen compound of the kind embraced by Formula I is incorporated into the acid-curing thermosetting resin in the form of a soluble, fusible aldehyde-reaction product thereof, then higher amounts of such reaction product ordinarily are used as compared with the amount employed when using the halogen compound itself. The halogen compound or its partial reaction product with an aldehyde may be incorporated into the acid-curing thermosetting resin either prior to, during or after the formation of the resin or prior to, during or after the formation of a molding composition containing the acid-curing thermosetting resin.

Examples of acid-curing thermosetting resins, the curing of which is accelerated by the halogen compounds herein described or by their soluble, fusible aldehyde-reaction products, are the acid-curing phenol-aldehyde resins, aminotriazine-aldehyde resins (e. g., melamine-formaldehyde resins), aminotriazole-aldehyde resins, triaminodiazine-aldehyde resins, urea-aldehyde resins (e. g., urea-formaldehyde resins), protein-aldehyde resins (e. g., casein-formaldehyde resins), aniline-aldehyde resins, resinous condensation products of aldehydes such as formaldehyde with polyamides as, for instance, malonic diamide, maleic diamide, fumaric diamide, itaconic diamide, etc. Other examples of amino or amido compounds (amidogen compounds) that may be condensed with aldehydes such as hereinbefore mentioned by way of illustration in forming an acid-curing thermosetting resin, more particularly an acid-curing aminoplast, are thiourea, diurea, diethylene triurea, methyl urea, acetyl urea, benzoylurea, phenyl thiourea, asymmetrical diethyl urea, allyl urea, 2-chloroallyl urea, ethylidene urea, guanyl urea, biguanidine, melamine, triureido melamine, ammeline, ammelide, melem, melam, melon, triamino pyrimidines, aminotriazoles, etc. Suitable mixtures of such compounds also may be used.

Phenol itself and various substituted phenols, for example the cresols, the xylenols, etc., may be condensed with aldehydes, e. g., formaldehyde, furfural, mixtures of formaldehyde and furfural, etc., to form acid-curing thermosetting resins of the phenoplast type, and these thermosetting resins then can be cured to the insoluble and infusible state with the aid of the hereindescribed halogen compounds or with the soluble, fusible aldehyde-reaction products thereof.

If desired, the fundamental reaction products of this invention may be modified by introducing other bodies before, during or after condensation between the primary components. Numerous examples of modifying agents that may be employed are given, for instance, in D'Alelio and Holmes Patent 2,265,688, issued December 9, 1941, page 3, column 2, lines 53-75, page 4, column 1, lines 1-40, which patent is assigned to the same assignee as the present invention.

Thermosetting molding compositions comprising a filler and an acid-curing thermosetting resin carrying a curing agent comprising a halogen compound of the kind described herein, or a soluble, fusible aldehyde-reaction product of such a halogen compound, may be molded into a variety of shapes under heat and pressure, more particularly at temperatures of the order of 100° to 200° C., preferably from approximately 120° to 180° C. The molding compositions show good plastic flow during molding since the curing agent not only functions as such but also generally serves to impart improved plastic flow to the molding composition. Molded articles of manufacture comprising the molded heat-hardened molding compositions of this invention have a good surface finish, show no evidence of "bleeding" the curing agent, are well cured throughout, and show no loss in any of their other useful properties due to the presence of the hereindescribed halogen compound or aldehyde-reaction product thereof.

What we claim as new and desire to secure by Letters Patent of the United States is:

1. A composition comprising an acid-curing, thermosetting resin carrying a curing agent therefor comprising a compound selected from the class consisting of (1) compounds corresponding to the general formula

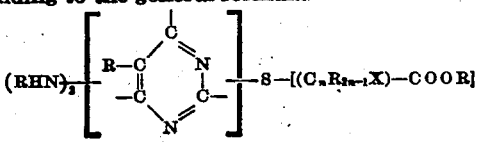

where $n$ represents an integer and is at least 1 and not more than 2, X represents a halogen atom, and R represents a member of the class consisting of hydrogen and monovalent hydrocarbon and halo-hydrocarbon radicals; and (2) soluble, fusible aldehyde-reaction products of the compounds of (1).

2. A composition comprising an acid-curing, thermosetting, phenol-aldehyde resin having incorporated therein a compound corresponding to the general formula

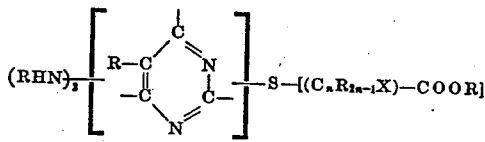

where $n$ represents an integer and is at least 1 and not more than 2, X represents a halogen atom, and R represents a member of the class consisting of hydrogen and monovalent hydrocarbon and halo-hydrocarbon radicals.

3. A composition comprising an acid-curing, thermosetting, amidogen-aldehyde resin having incorporated therein a compound corresponding to the general formula

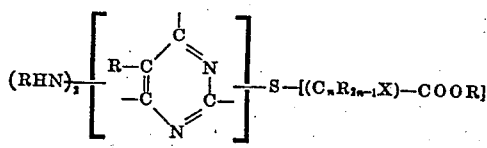

where $n$ represents an integer and is at least 1 and not more than 2, X represents a halogen atom, and R represents a member of the class consisting of hydrogen and monovalent hydrocarbon and halo-hydrocarbon radicals.

4. A composition of matter comprising the product of reaction of ingredients comprising an aldehyde and a compound corresponding to the general formula

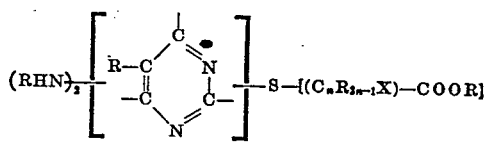

where $n$ represents an integer and is at least 1 and not more than 2, X represents a halogen atom, and R represents a member of the class consisting of hydrogen and monovalent hydrocarbon and halo-hydrocarbon radicals.

5. A composition as in claim 4 wherein the aldehyde is formaldehyde.

6. A composition comprising the product of reaction of ingredients comprising a phenol, an aldehyde and a compound corresponding to the general formula

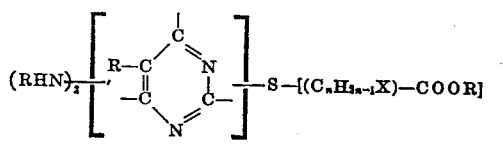

where $n$ represents an integer and is at least 1 and not more than 2, X represents a halogen atom, and R represents a member of the class consisting of hydrogen and monovalent hydrocarbon and halo-hydrocarbon radicals.

7. A composition comprising the product of reaction of ingredients comprising a urea, an aldehyde and a compound corresponding to the general formula

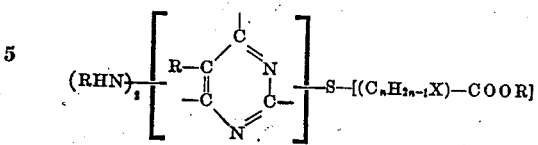

where $n$ represents an integer and is at least 1 and not more than 2, X represents a halogen atom, and R represents a member of the class consisting of hydrogen and monovalent hydrocarbon and halo-hydrocarbon radicals.

8. A heat-curable resinous condensation product of ingredients comprising urea, formaldehyde and a compound corresponding to the general formula

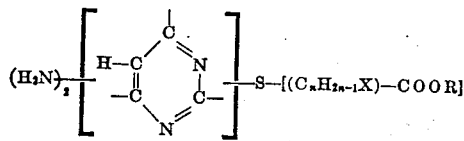

where $n$ represents an integer and is at least 1 and not more than 2, X represents a halogen atom, and R represents a member of the class consisting of hydrogen and monovalent hydrocarbon and halo-hydrocarbon radicals.

9. A product comprising the cured resinous condensation product of claim 8.

10. A condensation product of ingredients comprising an aldehyde and a compound corresponding to the general formula

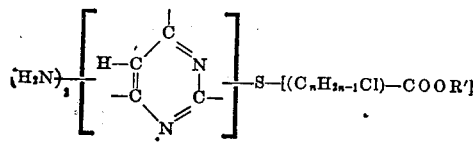

where $n$ represents an integer and is at least 1 and not more than 2, and R' represents an unsubstituted monovalent hydrocarbon radical.

11. A condensation product of ingredients comprising an aldehyde and a compound corresponding to the general formula

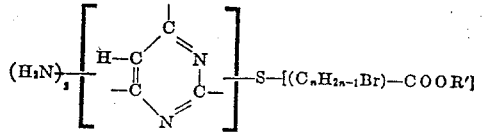

where $n$ represents an integer and is at least 1 and not more than 2, and R' represents an unsubstituted monovalent hydrocarbon radical.

12. A composition comprising the resinous product of reaction of ingredients comprising an aminotriazine, an aldehyde and a compound corresponding to the general formula

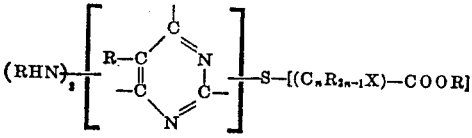

where $n$ represents an integer and is at least 1 and not more than 2, X represents a halogen atom, and R represents a member of the class consisting of hydrogen and monovalent hydrocarbon and halo-hydrocarbon radicals.

13. A composition comprising the resinous product of reaction of (1) a partial condensation product of ingredients comprising a phenol and an aldehyde, and (2) a compound corresponding to the general formula

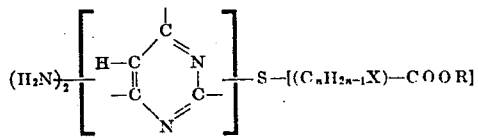

where $n$ represents an integer and is at least 1 and not more than 2, X represents a halogen atom and R represents a member of the class consisting of hydrogen and monovalent hydrocarbon and halo-hydrocarbon radicals.

14. A composition comprising the resinous product of reaction of (1) a partial condensation product of ingredients comprising a urea and an aldehyde, and (2) a compound corresponding to the general formula

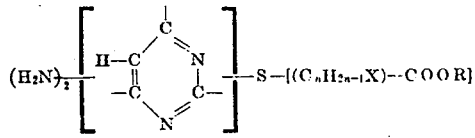

where $n$ represents an integer and is at least 1 and not more than 2, X represents a halogen atom and R represents a member of the class consisting of hydrogen and monovalent hydrocarbon and halo-hydrocarbon radicals.

15. A composition comprising the product of reaction of ingredients comprising an aldehyde and a diamino pyrimidyl halogeno carboaliphaticoxy-ethyl sulphide.

16. A resinous composition comprising the product of reaction of (1) a partial condensation product obtained by reaction, while admixed with an alkaline substance, of ingredients comprising urea and formaldehyde, and (2) a diamino pyrimidyl halogeno carboalkoxy-ethyl sulphide.

17. A resinous composition comprising the product of reaction of (1) a partial condensation product obtained by reaction, while admixed with an alkaline substance, of ingredients comprising melamine and formaldehyde, and (2) a diamino pyrimidyl halogene carboalkoxy-ethyl sulphide.

18. A composition comprising the product of reaction of ingredients comprising an aldehyde and 4,6-diamino pyrimidyl-2 bromo carbomethoxy-ethyl sulphide.

19. A composition comprising the resinous product of reaction of ingredients comprising urea, formaldehyde and 4,6-diamino pyrimidyl-2 bromo carbomethoxy-ethyl sulphide.

20. The method of preparing new condensation products which comprises effecting reaction between ingredients comprising an aldehyde and a compound corresponding to the general formula

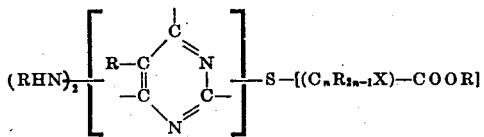

where $n$ represents an integer and is at least 1 and not more than 2, X represents a halogen atom, and R represents a member of the class consisting of hydrogen and monovalent hydrocarbon and halo-hydrocarbon radicals.

GAETANO F. D'ALELIO.
JAMES W. UNDERWOOD.

CERTIFICATE OF CORRECTION.

Patent No. 2,344,289.  March 14, 1944.

GAETANO F. D'ALELIO, ET AL.

It is hereby certified that error appears in the printed specification of the above numbered patent requiring correction as follows: Page 2, first column, line 21, for "pyyrimidyl" read --pyrimidyl--; line 37, for "diaminopyrimidyl" read --diamino pyrimidyl--; page 3, first column, line 38, for "arcylic" read --acrylic--; page 4, first column, line 57, Example 5, for "diaminopyrimidyl" read --diamino pyrimidyl--; page 5, first column, line 4, Example 8, after "water" insert a closing parenthesis; page 8, second column, line 10, claim 17, for "halogene" read --halogeno--; and that the said Letters Patent should be read with this correction therein that the same may conform to the record of the case in the Patent Office.

Signed and sealed this 23rd day of May, A. D. 1944.

Leslie Frazer (Seal)  Acting Commissioner of Patents.